Feb. 23, 1960     D. B. PALL     2,925,650
METHOD OF FORMING PERFORATE METAL SHEETS
Filed Jan. 30, 1956     2 Sheets-Sheet 1

*INVENTOR.*
DAVID B. PALL

Feb. 23, 1960  D. B. PALL  2,925,650
METHOD OF FORMING PERFORATE METAL SHEETS
Filed Jan. 30, 1956  2 Sheets-Sheet 2

INVENTOR.
DAVID B. PALL

United States Patent Office 2,925,650
Patented Feb. 23, 1960

2,925,650

METHOD OF FORMING PERFORATE METAL SHEETS

David B. Pall, Roslyn Heights, N.Y., assignor, by mesne assignments, to Pall Corporation, a corporation of New York Application January 30, 1956, Serial No. 562,127

19 Claims. (Cl. 29—160)

This invention relates to perforate metal sheets and to methods of forming the same. More particularly it relates to perforate metallic sheet material formed of interwoven metallic filaments treated by controlled, interrelated deforming and sintering operations.

Present day problems of filtration, control of boundary layers in high velocity gas flow, de-icing airfoils, temperature control for normally severely heated parts and the like are being met increasingly by the use of porous sintered metal particle layers, as described in U.S. Patent No. 2,554,343. In general, considerable difficulty has been encountered in providing such products to meet the critical factors of close control of uniformity in the number, size, and shape of the pores, and in tensile strength, ability to be worked as in machining and welding, and cost.

It has been suggested that perforate sheet materials having a myriad of uniformly and precisely dimensioned pores formed therein be employed. However, the preparation of these also has met with difficulties.

One method of preparing such material is to drill holes in a metallic sheet in the desired pattern. This is expensive, and quite difficult to do in thick sheet material when the pores are to be set on close centers.

Another method, which has been described in U.S. Patent No. 2,423,547 to Behlen, dated July 8, 1947, involves rolling a wire mesh screen to a flat sheet. The use of a woven mesh screen is not practical in most instances because very fine filaments are necessary for small pore openings to be provided, and such a screen material is therefore inherently weak. Also, such screens clog readily when used as filters because particles tend to lodge in the convolutions at the crossing points of the filaments. Behlen worked out a method of utilizing the coarser wire screens, 100 mesh to the inch or less, woven from a wire approximately 0.0045 inch in diameter, by rolling the screen to reduce the size of the holes. This material can be reduced to a pore diameter equivalent to that of a 180 to 200 mesh screen, but with fewer pores per square inch. Moreover, in the Behlen screen the ability of the wires to shift in position relative to each other both before and after rolling to the desired porosity present difficulties in preserving uniformity in porosity and in pore size, and materially reduces the strength, rigidity and effectiveness of the resulting product.

In accordance with the present invention, these difficulties are overcome by sintering the filaments of the woven wire mesh screen to integrate them at some stage of the process. If the filaments are woven in a weave in which they are able to shift in their relative positions, the filaments are integrated by sintering prior to deforming as by rolling. If the filaments are woven in a weave in which they are stabilized against relative movement, the sintering operation can be carried out after rolling, although, of course, there is no reason why the filaments cannot be sintered prior to rolling, if desired. In certain cases the effect of the rolling operation can be imparted to the work by the application of pressure during sintering. This method makes it practical to prepare perforate metallic sheet products from screen materials formed of very fine wires, appreciably finer than is used in 100 mesh screen. In fact, screens of 350 mesh and smaller can be utilized in the process of the invention to provide perforate metallic sheet products having a relatively large number of pores in a uniform pattern and of a uniform porosity in a very thin sheet.

In accordance with the present invention, therefore, there are provided perforate metallic sheet products and methods of making the same wherein pores of uniform size and shape and in relatively large numbers relative to the total sheet areas are readily attainable at relatively low cost. Perforate products formed in accordance with the present invention are also capable of production in a wide range of strengths and forms capable of passing extremely large volumes of fluid. Moreover, if fines are entrained in the fluids the product is capable of stopping, without appreciable loss in capacity, relatively large quantities of all fines exceeding a predetermined size.

The pore diameter of the perforate metallic sheet products in accordance with the invention may range below 5 microns. The finest woven wire mesh screen that has been available has a pore opening of about 35 microns.

Thus, in accordance with the invention a perforate material having a pore opening less than ever before available in the finest woven wire mesh screen has been made possible. Depending upon the pore opening in the starting material, a wide range of pore openings can be achieved, ranging from 5 to 45 microns in average diameter, utilizing 100 to 350 mesh screen material.

To these ends, the present invention contemplates the use of metallic filaments interwoven in any weave style, with the relative positions of the filaments in the weave being initially stabilized either by characteristics of the weave itself or by integrating contacting surfaces of the interwoven filaments in a sintering operation. Once fixed in their relative positions or simultaneously with the sintering operation, the interwoven filaments are deformed by subjecting them to pressure normal to the plane of the product as by rolling, pressing, coining or the like, to establish numerous permanently flattened coplanar surfaces on each face of the work and, at the same time, to enlarge the contiguous surface areas between the interwoven filaments. With the enlargement of the contiguous surface areas and the flattening of the faces, the size of the pores in the screen is reduced by a controlled amount which usually bears a direct relationship to the overall diminution of thickness of the work as a result of the applied deforming pressure. The operation can be completed by further sintering, also preferably under light pressure, to integrate the enlarged contiguous surface areas between the filaments, with the resulting product being a rigid metallic sheet having pores of precisely controlled size and shape.

Identical or non-identical sheets formed in generally the same manner can be brought together face to face and fused together in yet another sintering operation, preferably under light pressure, to form a multiple layer sheet, normally of greater rigidity.

Pore openings of various configurations can be obtained, depending upon the type of weave of the starting material. A square weave screen will give a "straight through" type of opening in which the pores run straight and roughly at right angles to the surfaces of the sheet. A "Dutch" weave, plain or twilled, will give an angled pore, in which the pore runs at an angle usually from 30 to 60° to the surfaces of the sheet. By appropriate arrangement of several "Dutch" weave or square weave sheets to form a multilayer structure, a zig-zag type of pore opening will be obtained in which the direction of the pores will depend upon the position of the several sheet layers relative to each other, and the weave.

Several products and methods in accordance with the present invention are described in detail below, having reference in one embodiment to the accompanying drawing in which.

Figure 1:
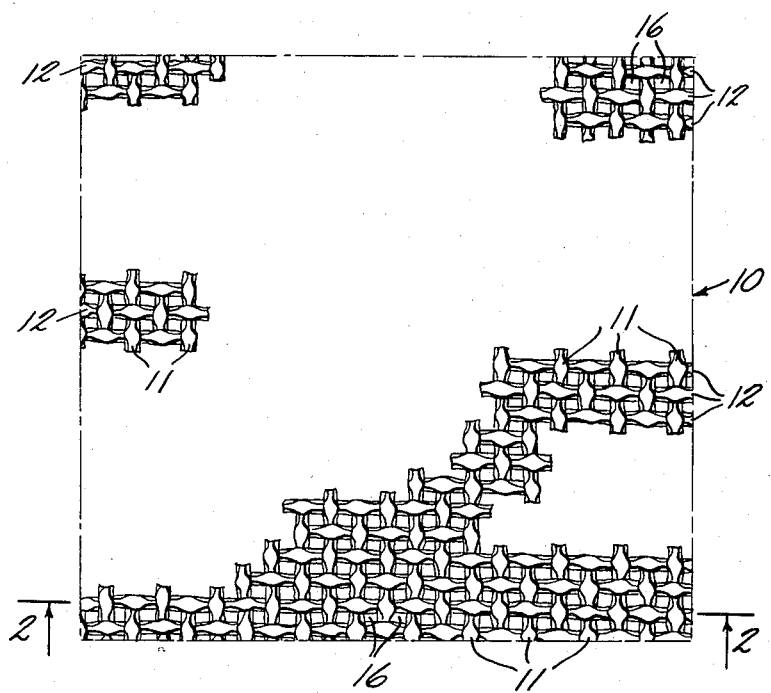
Figure 1 is a plan view of a rigid perforate metallic sheet material.

In general, the metallic filaments can be formed from any of a wide range of materials capable of being processed in the form of woven wire mesh, for example, stainless steel, such as Type 304 or Type 316 Stainless Steel, nickel and nickel alloys, such as Monel, N-155 alloy and Hastelloy C, aluminum, silver and copper.

The usefulness of perforate sheet material for filtration can be improved in certain situations in accordance with the present invention by incorporating permanent magnetic material in the sheet by utilizing filaments in the initial weaving operation formed of a material which can be magnetized to a high flux value. The finished perforate sheet product is then magnetized with alternate north and south poles on close centers, the pole direction being at right angles to the plane of the sheet. It has been found that a filter so formed removes extreme fines of magnetic materials from fluid media passed therethrough. A second means for obtaining a magnetic filter is to use a woven wire cloth with a non-magnetic warp and a "soft" magnetic filling or weft. When the resulting sheet is placed in a magnetic field in a direction parallel to the warp, a north-south gap results between each neighboring pair of filling wires. Such a configuration is even more effective in removing fine magnetic particles than the one described above. It is, of course, equally possible to use a magnetic warp and non-magnetic filling.

With the initial weave stabilized, either by sintering or by the weave, the work can be subjected to deforming pressure of the order of 5000 to 200,000 lbs. per square inch, the pressure applied depending upon the ductility of the metal, normal to its surfaces as by rolling or coining, for example, to reduce its thickness. In practice reductions in thickness from 5% to 65% of the initial thickness of the woven product have been carried out with beneficial results. The applied pressure results in a permanent deformation of the work by flattening the undulations or nodes of the interwoven filaments in the two faces of the work, forcing flattened material to encroach upon the holes in the mesh to decrease their size in precisely controlled amounts, and increasing the contiguous or contacting surfaces between the interwoven warp and weft filaments. The enlargement of these contiguous surfaces includes or encompasses the previously sintered contacting surfaces at the points of crossover of the filaments. The work is then subjected to a sintering operation thereby to integrate or bond the enlarged contiguous surfaces between the interwoven filaments.

In the sintering operation the work is passed through a furnace in a non-oxidizing atmosphere such for example as a reducing atmosphere of hydrogen, carbon monoxide, or mixtures thereof, an inert atmosphere such as nitrogen, argon, helium, or combinations thereof, or a vacuum. A temperature at which the metal can be bonded to itself, near but less than the melting point of metal of which the filaments are formed, is used, a range from 1000° F. to approximately 20° F. less than the melting point having been found useful for most purposes.

A perforate sheet material which has been so processed can, depending upon the degree of deformation, give a differing appearance in its final form. A square weave material compressed to a thickness of approximately 35% of the starting thickness for example has the general appearance of a sheet of solid metal through which rectangular holes have been machined.

In general, where metals are used which have very low yield strength after heating in the sintering temperature range, such for example as Monel, nickel and copper, it is advisable to accomplish only part of the compression in the first step, then after the last sintering operation to compress further, to the required pore size. In this way the final product can, by final work hardening, be made to have a high yield strength, still coupled with adequate ductility.

In one of its embodiments the invention contemplates the formation of a rigid perforate metallic sheet by preparing in a weaving operation, a plain or square weave mesh using metallic filaments. A plain "Dutch" weave can also be used. The wire mesh should be stabilized as to the relative positions of the metallic filaments. In the case of a simple square weave mesh in which both warp and weft filaments are equally spaced, the initial stabilization of the weave pattern can be effected by integrating the interwoven filaments at the crossover points by sintering.

Figure 2:
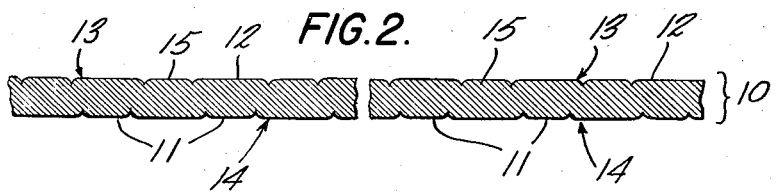
Figure 2 is a view in transverse section taken on the line 2—2 of Figure 1 looking in the direction of the arrows.

Referring to Figure 1, there is shown a fragment 10 of a perforate sheet material formed in accordance with the process described above from a plain square weave wire mesh screen but deformed to decrease the thickness by less than 50%, thus retaining more of the identity of the original weave structure. The weave includes warp and weft filaments 11 and 12, respectively, which are deformed in the upper and lower surfaces 13 and 14, respectively. The deformed portions of the several filaments in each face of the sheet 10 are substantially coplanar, as best seen in Figure 2. Enlarged contiguous surfaces 15 appear between the interwoven and adjacent filaments 11 and 12 which have been joined by sintering to form the finished product. Defined by the interwoven deformed and sintered filaments are pores 16 of substantially uniform size throughout. The pores 16 are substantially rectangular in shape and pass straight through the sheet at right angles thereto.

Figure 3:
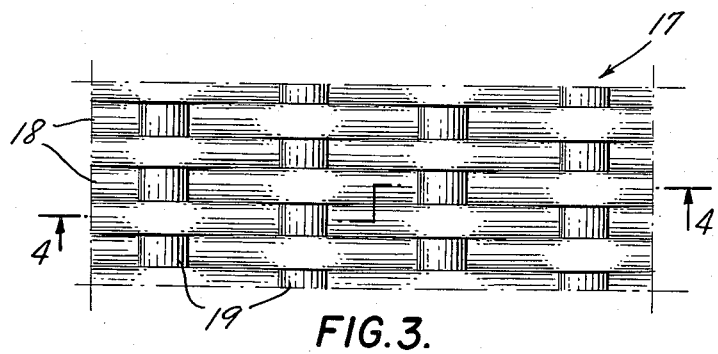
Figure 3 is a plan view of a rigid perforate metallic sheet material.
Figure 4:
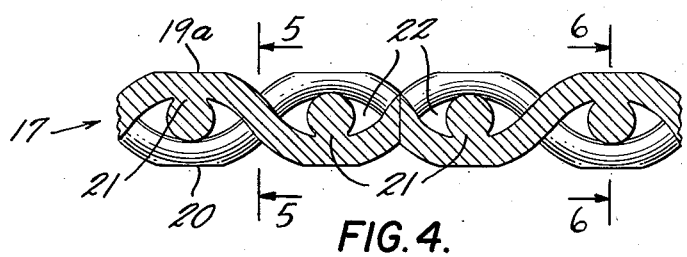
Figure 4 is a view in transverse section taken on the line 4—4 of Figure 3 looking in the direction of the arrows.
Figure 5:
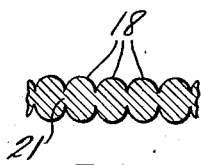
Figure 5 is a view in transverse section taken on the line 5—5 of Figure 4.
Figure 6:
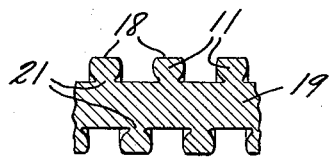
Figure 6 is a view in transverse section taken on the line 6—6 of Figure 4.

Referring to Figure 3, there is shown a fragment 17 of a perforate sheet material formed in accordance with the process described above from a plain "Dutch" weave wire mesh screen but deformed to decrease the thickness by considerably less than 50%, and less than the sheet material of Figures 1 and 2, thus retaining even more of the identity of the original weave structure. The weave includes warp and weft filaments 18 and 19, respectively, which are slightly deformed in the upper and lower surfaces 19a and 20, respectively. The deformed portions of the several filaments in each face of the sheet 17 are substantially coplanar, as best seen in Figures 4 and 6. Slightly enlarged contiguous surfaces 21 appear between the interwoven and adjacent filaments 18 and 19 which have been joined by sintering, either before, during or after deforming. Defined by the interwoven deformed and sintered filaments are pores 22 (Figure 4) of substantially uniform size throughout and at an angle to the plane of the sheet.

In accordance with the present invention, two or more sheets of mesh treated in accordance with the process described above to form rigid perforate sheets can be joined together in face to face relation by a sintering operation to form a compound sheet. In order to avoid the appearance of undesirable interference patterns due to slight variations in the weave as between the two sheets and in order to keep permeability at a maximum, it is sometimes preferable to lay adjacent sheets of the perforate material so that the corresponding woven filaments in each lie at an angle to each other.

It is also possible to join by sintering operations, one, two or more rigid perforate sheets to a solid or imperforate backing sheet and if desired, the resulting product can be further deformed by the application of pressure normal to its surfaces as by coining or rolling operations to reduce further the overall thickness, the product then being resintered to integrate or join newly created contiguous surfaces between the filaments. A porous sheet joined to a solid sheet backing can be used, among other uses, as a bearing.

It is possible, in accordance with the invention, to prepare rigid perforate sheets formed of metallic filaments using a complex weave. A twilled "Dutch" weave can be used in which each weft filament goes over and under a pair of warp filaments, the pairs alternating from one weft filament to the next, or various special weaves such for example as a "Ton-Cap" weave in which the effective spaces between the filaments are relatively long and narrow. The various weaves described above can be relatively fixed or stabilized, if necessary, in a preliminary sintering operation to join contiguous surfaces between the interwoven filaments, subjected to deforming pressures normal to their surfaces, as by pressing, rolling or coining, to a thickness which can in some instances be as small as one-third as the original starting thickness, and then resintering to join the enlarged contiguous surfaces.

If desired, the tensile strength for such a material can be made higher in one direction than it is in another, depending on the warp and weft count and filament diameters.

It should be understood that the complex weave products, suitably formed in accordance with the present invention into rigid perforate sheets, can be combined in multiple layers. By placing two layers of identically formed sheet materials in face to face relationship with the weave pattern at right angles, joining the two by sintering, deforming by the application of pressure normal to the surfaces, and joining again by resintering, a composite material of equal strength in all direction can be obtained. By placing two or more substantially identical sheets in face to face relationship with the weave pattern parallel, a product can be obtained having oriented strength. In this connection it should be observed that unlike plain or square weave materials, products of excellent quality are obtained using complex weaves such for example as the "Dutch" weaves, when adjacent layers or sheets are mated with the weave patterns parallel.

In accordance with the invention, it is possible to prepare a stabilized weave pattern in which the initial sintering operation can be dispensed with. In a tightly woven "Dutch" weave, for example, in which the filaments are in lateral abutting relationship so as to preclude relative movement during a rolling or coining operation, the work can be deformed, as by rolling or coining, without interposing a sintering step. In a relatively loosely woven square weave, it is believed that the considerable lateral spacing between adjacent filaments in both warp and weft affords an opportunity for lateral relative displacement which makes a preliminary sintering operation essential.

In accordance with the invention it is possible to prepare a rigid perforate sheet which is extremely thin as well as fine in pore size. Beginning with a wire mesh of 325 count, sintered, deformed and sintered to achieve an average pore size of 25 microns (from an original average pore size of 43 microns) a sheet of approximately 0.001 inch thickness results. Similarly, a 200 x 1500 wire mesh using 0.0029/0.0013 inch diameter filaments and which has been rolled to an average pore size of 5 microns, has a thickness of approximately 0.002 inch. Such materials can be sintered if necessary to facing materials in order to provide the strength for mounting, to permit fabrication into tubes, welding or the like.

A representative process for making relatively fine and coarse materials, and for making a composite sheet in which the coarse material as a backing is sintered to the fine material as a facing, can be carried out as follows.

*Example A*

325 x 325 square weave mesh using a 0.0013 inch diameter filament of Type 304 or 316 Stainless Steel is sintered at 2350° F. and thereafter subjected to heavy deforming forces in a rolling mill. After rolling the work is further deformed by passing it through a pair of coining dies which coin a small area at a time, the work being moved slowly through the dies so that the whole area is uniformly reduced in thickness until the opening size has been reduced to an average of 20 microns, at which time the overall thickness will be about 0.0011 inch.

*Example B*

A 60 x 60 square weave mesh using a 0.011 inch filament of Type 304 or 316 Stainless Steel is sintered at 2350° F. to fuse the filaments at their crossover points, and then deformed to reduce the thickness to 0.017 inch.

*Example C*

The fine 325 mesh is then laid on the coarser 60 x 60 mesh and the two passed through a furnace at 2350° F. in a sintering operation in order to join them together.

In order to further improve the union, the work on issuing from the furnace can be passed through a deforming operation in a rolling mill to reduce the thickness by 0.001 to 0.002 inch and then resintered at 2350° F. The final product has been found to have a flow capacity which is reduced by less than 10% from that of the coined 325 mesh sheet, taken alone, has an overall thickness of approximately 0.016 to 0.017 inch, and has strength and rigidity while retaining enough formability such that it can be readily formed into tubes or welded, for example.

*Example D*

In another example of a composite material, two layers of 12 x 64 square weave mesh using 0.023–0.0165 inch filaments of Type 316 Stainless Steel are placed together, and sintered at 2350° F. Upon issuing from the sintering furnace, the work is passed through a rolling mill in order to reduce the overall thickness to 0.050 inch. A 50 x 300 twilled "Dutch" weave using 0.0049–0.0036 inch filaments of Type 316 Stainless Steel is passed through a rolling mill in order to reduce the pore size to a value such that the maximum glass bead which will pass through it in water suspension is 25 microns. The deformed work is then placed on top of the 0.050 inch thick sintered assembly and the two passed through a sintering furnace at 2350° F. Upon issuing, the resultant composite is reduced in thickness by 0.001 to 0.002 inch by rolling and then resintered. The resultant composite material can readily be rolled, deformed, welded, or the like, and simple discs of this material can be pressed, and fitted into cavities, where they will withstand high differential fluid pressures thereacross.

*Example E*

A fine 60 x 60 square weave using a 0.011 inch diameter filament of Monel is sintered at 2050° F. and deformed under pressure. A coarse 8 x 8 square weave using a 0.050 inch filament of Monel is sintered at 2050° F. and deformed under pressure. The two are integrated or joined together in face to face relationship by sintering with corresponding filaments at an angle to each other.

In the sintering together of two layers of wire mesh material in the practice of the present invention and in the initial sintering of the weave patterns of each, it has been found that the application of a slight pressure can be used to effect deformation and to improve the integration. Pressures of approximately 5 lbs. per square foot and more upon the work being sintered, as by imposing metal weights thereon, have been found to afford excellent results. In order to avoid adherence of the objects being sintered to the neighboring layers of material, they are separated by layers of suitable inorganic material which may be metal oxides or silicates or combinations thereof which are not chemically affected by the sintering atmosphere.

The sintered, rolled, and woven wire of this invention may also be combined by sintering together with other porous media such as the porous stainless steel disclosed in U.S. Patent No. 2,554,343, or perforate media such as sheet material containing holes mechanically or chemically (etching) formed. They can also be combined with electroformed nickel or nickel-copper or copper screens.

When a stainless steel rolled and sintered sheet material is combined with electroformed nickel, due to interdiffusion which occurs at high temperature, the nickel is converted to a chromium iron alloy, the composition of which can be brought very close to that of the stainless steel if the time at temperature is sufficiently prolonged, and if the mass of stainless steel greatly exceeds that of the nickel. Such nickel screens can be formed with as many as 1,000,000 to 4,000,000 holes per square inch but they are in themselves very thin, foil-like materials of no practical application in filtration. Co-sintering which bonds these to a strong rigid sintered and rolled woven stainless material represents, therefore, a very useful technique.

In another variation of this technique, the electroformed nickel is plated with 5 to 25% by weight of chromium prior to sintering. In this way, a high chromium content alloy, very resistant to attack by a variety of chemical reagents, and to atmospheric corrosion, is obtained with a shorter sintering cycle.

The perforate metallic sheet materials in accordance with the invention which can be made with pores having axes normal to the plane of the sheet and smaller than a 35 micron square, have a higher flow capacity for an average pore opening diameter per square inch than a porous material made from a sintered metal powder. It is thought that this is due to the greater uniformity of hole size of material of the invention. The simple flow path through the perforated metallic sheet material also contributes to high flow, compared with the tortuous path through a sintered powder porous metal. When properly selected wire combinations are used, the perforated metallic sheet material can have two or more times as many effective holes per unit area, compared with materials made from powder, contributing to higher flow rate for equal pore size. The perforate metallic sheets can also be made by the present invention to contain more than 225,000 pores per square inch, each pore consisting of a direct opening through the sheet material at an angle between 30 and 90° to the plane thereof, each pore being sufficiently small to hold back spherical particles of 5–10 microns. Such sheets also have substantially higher flow capacity for equal maximum pore size, compared with filter media made from powder.

The perforate metallic sheets of the invention are particularly useful in tangential flow filtration wherein the stream of liquid to be filtered is flowed across the surface of the filter and a portion passes through the filter while another portion flows past the filter and thus bypasses it. This type of filter is used in airplane engine carburetors. The perforate metallic sheet materials of the invention are also characterized by an exceedingly high tensile strength compared to porous structures formed of sintered metal particles. The tensile strength of a porous metal filter 1/16 inch thick having a flow capacity of 10 feet per second at 2 p.s.i. is of the order of 6000 to 8000 p.s.i. In contrast, the perforate materials of the invention of the same flow capacity can be made with tensile strength of 25,000 p.s.i. or more.

While representative embodiments of the invention have been described above, it will be apparent to those skilled in the art that various combinations of weave patterns, and combinations of processing steps can be carried out within the scope of the present invention, which should not, therefore, be regarded as limited except as defined by the following claims.

I claim:

1. In a process for forming fluid permeable metallic sheet material, the steps of applying deforming pressure normal to the planes of a sheet of contiguous metallic warp and weft filaments defining therebetween pore openings having a diameter of less than about 0.075 inch and sintering the sheet at a sintering temperature not in excess of 20° F. below the melting point of the metal to join the contiguous filaments permanently by sintered integration of the metal.

2. In a process for forming fluid permeable metallic sheet material, the steps of applying deforming pressure normal to the planes of a sheet of interwoven metallic warp and weft filaments defining therebetween pore openings having a diameter of less than about 0.075 inch having the filaments running in at least one direction in the weave stabilized against relative lateral movement, said pressure being sufficient to establish permanently deformed enlarged contiguous surfaces between the interwoven filaments, and sintering the sheet at a sintering temperature not in excess of 20° F. below the melting point of the metal to join the contiguous filaments permanently by sintered integration of the metal.

3. A process as set forth in claim 2, said pressure being sufficient to reduce the total thickness of the woven sheet to a value between approximately 30 and 95% of its initial thickness.

4. A process as set forth in claim 2, said sintering operation being carried out at a temperature in the range between 20 and 1000° F. below the melting point of the metallic filaments.

5. A process as set forth in claim 2, said sintering operation being carried out in a non-oxidizing atmosphere.

6. A process as set forth in claim 2 including disposing a second metallic sheet material in face to face relation with the fluid permeable metallic sheet material, and sintering the two to join them permanently to form a single sheet.

7. A process as set forth in claim 2, said metallic filaments being formed at least in part of magnetic material.

8. A process as set forth in claim 2, including applying deforming pressure sufficient to flatten the filaments in each face of the sheet to establish tight lateral abutment between adjacent filaments about the pores, thereby to form a substantially continuous metallic surface on each face of the sheet pierced by said pores.

9. A process as set forth in claim 2, including applying pressure normal to the plane of the sheet while sintering is being carried out.

10. A process as set forth in claim 2, said pressure applied during sintering being greater than 5 lbs. per square foot.

11. In a process for forming fluid permeable metallic sheet material the steps of preparing from metallic filaments a fabric having openings between the filaments whose diameter is less than about 0.075 inch, and having its filaments which run in at least one direction in the weave stabilized against relative lateral movement, applying deforming pressure normal to the plane of the stabilized fabric to form permanently enlarged contiguous surfaces between filaments, and sintering the sheet at a sintering temperature not in excess of 20° F. below the melting point of the metal to join permanently the enlarged contiguous surfaces.

12. In a process for forming fluid permeable metallic sheet material, the steps of sintering a fabric of metallic warp and weft filaments defining therebetween pore openings having a diameter of less than about 0.075 inch at a temperature not in excess of 20° F. below the melting point of the metal to join the contiguous surfaces of the interwoven filaments, applying deforming pressure normal to the plane of the sintered fabric to form permanently enlarged contiguous surfaces between the interwoven filaments, and resintering the sintered fabric at a temperature not in excess of 20° F. below the melting point of the metal to join the enlarged contiguous surfaces permanently.

13. In a process for forming fluid permeable metallic sheet material, the steps of sintering a fabric of metallic warp and weft filaments by heating to a temperature close to but less than the melting point of the metallic filaments, flattening the sintered fabric by applying pressure normal to the planes of its surfaces to reduce the thickness thereof by 5 to 65% of its original thickness, and resintering the flattened sheet by heating to a temperature close to but less than the melting point of the metallic filaments, thereby to unit the contiguous metal surfaces established by the flattening operation and not united by the first sintering operation.

14. A process for forming fluid-permeable metallic sheet material which comprises applying deforming pressure normal to the planes of a sheet of contiguous metallic warp and weft elements defining therebetween pore openings having a diameter of less than about 0.075 inch while sintering the sheet at a sintering temperature not in excess of 20° F. below the melting point of the metal to join the contiguous filaments permanently by sintered integration of the metal.

15. A process as set forth in claim 14, the deforming pressure applied during sintering being greater than 5 lbs. per square foot.

16. A process as set forth in claim 14 applied to a plurality of pore-containing metallic sheet materials in juxtaposition, sintering them to join them permanently together to form a single composite sheet.

17. A process as set forth in claim 16 in which the plurality of metallic sheet materials comprise a sheet having relatively coarse pore openings and filaments in pore-connecting juxtaposition to a sheet having a smaller pore openings and filaments.

18. A process as set forth in claim 16 in which one of the sheets is a perforated metal plate.

19. A process for forming fluid-permeable sheet material which comprises applying deforming pressure greater than 5 lbs. per square foot normal to the planes of a sheet of contiguous metallic warp and weft filaments defining therebetween pore openings having a diameter of less than about 0.075 inch and sintering the sheet at a sintering temperature not in excess of 20° F. below the melting point of the metal to join the contiguous filaments permanently by sintered integration of the metal.

References Cited in the file of this patent

UNITED STATES PATENTS

| | | |
|---|---|---|
| 781,015 | Orr | Jan. 31, 1905 |
| 1,027,917 | Smith | May 28, 1912 |
| 1,043,576 | Eldred | Nov. 15, 1912 |
| 1,130,077 | Eldred | Mar. 2, 1915 |
| 1,767,814 | Reynolds | June 24, 1930 |
| 1,814,598 | Hermann | July 14, 1931 |
| 1,934,643 | Ratton | Nov. 7, 1933 |
| 2,082,513 | Roberts | June 1, 1937 |
| 2,423,547 | Behlen | July 8, 1947 |
| 2,424,557 | DeBra | July 29, 1947 |
| 2,633,630 | Woods | Apr. 7, 1953 |
| 2,691,815 | Boessenkool | Oct. 19, 1954 |
| 2,694,852 | Rogers | Nov. 23, 1954 |
| 2,739,369 | Cooney | Mar. 27, 1956 |
| 2,741,828 | Matthew | Apr. 17, 1956 |

UNITED STATES PATENT OFFICE

CERTIFICATE OF CORRECTION

Patent No. 2,925,650            February 23, 1960

David B. Pall

It is hereby certified that error appears in the printed specification of the above numbered patent requiring correction and that the said Letters Patent should read as corrected below.

Column 1, line 53, for "to", second occurrence, read -- or --; column 3, line 32, for "valne" read -- value --; column 5, line 45, for "direction" read -- directions --; column 10, line 8, after "having" strike out "a".

Signed and sealed this 9th day of August 1960.

(SEAL)
Attest:

KARL H. AXLINE            ROBERT C. WATSON
Attesting Officer            Commissioner of Patents